(12) United States Patent
Zhu et al.

(10) Patent No.: US 9,025,568 B2
(45) Date of Patent: May 5, 2015

(54) DOWNLINK ORTHOGONAL VARIABLE SPREADING FACTOR CODE ASSIGNMENT METHOD AND BASE STATION SYSTEM USING THE SAME

(71) Applicant: Sernet (Suzhou) Technologies Corporation, Jiangsu (CN)

(72) Inventors: Ling Zhu, Su Zhou (CN); Ning Tao, Jiangsu (CN)

(73) Assignee: Sernet (Suzhou) Technologies Corporation, Jiangsu (CN)

( * ) Notice: Subject to any disclaimer, the term of this patent is extended or adjusted under 35 U.S.C. 154(b) by 212 days.

(21) Appl. No.: 13/675,596

(22) Filed: Nov. 13, 2012

(65) Prior Publication Data

US 2013/0121314 A1    May 16, 2013

(30) Foreign Application Priority Data

Nov. 14, 2011 (CN) .......................... 2011 1 0359582

(51) Int. Cl.
*H04B 7/216* (2006.01)
*H04W 72/04* (2009.01)

(52) U.S. Cl.
CPC ........ *H04W 72/044* (2013.01); *H04W 72/0466* (2013.01)

(58) Field of Classification Search
CPC . H04L 12/5695; H04L 41/0893; H04L 47/14; H04L 47/15; H04L 47/20; H04L 47/2416; H04L 47/41; H04L 47/765; H04L 47/801; H04L 47/808; H04L 47/822; H04L 47/824; H04L 63/102; H04W 12/06; H04W 28/18; H04W 74/00; H04W 88/16; H04M 7/006
USPC .................................................. 370/208–356
See application file for complete search history.

(56) References Cited

U.S. PATENT DOCUMENTS

| | | | |
|---|---|---|---|
| 6,526,065 B1 * | 2/2003 | Cheng ........................... | 370/441 |
| 6,693,952 B1 * | 2/2004 | Chuah et al. .................. | 375/140 |
| 6,879,576 B1 * | 4/2005 | Agrawal et al. ............... | 370/342 |

(Continued)

FOREIGN PATENT DOCUMENTS

CN    1384628 A    12/2002

OTHER PUBLICATIONS

Full English (machine) translation of CN1384628 (Published Dec. 11, 2002).

*Primary Examiner* — Nicholas Sloms
(74) *Attorney, Agent, or Firm* — McClure, Qualey & Rodack, LLP (57) ABSTRACT

A downlink orthogonal variable spreading factor (OVSF) code assignment method is provided. It is determined whether a spreading factor required by a service request is greater than a remaining capacity of assignable spreading factors of a code tree. If not, the code tree is searched from a root until a node of a layer corresponding to the required spreading factor is reached and thus defined as a first node. During the searching, when a searched node is unassigned, the searching continues leftward in a lower layer; and when the searched node is in an assigned state, the searching continues rightward in a same layer of the searched node. It is determined, from the first node, whether any assignable code is available in the layer corresponding to the required spreading factor. If available, an assignable code is assigned to a communication service corresponding to the service request.

13 Claims, 6 Drawing Sheets

(56) References Cited

U.S. PATENT DOCUMENTS 6,907,060 B2 * 6/2005 Yang .............................. 375/141
6,982,946 B2 * 1/2006 Wiberg et al. ................ 370/208
2004/0131008 A1 7/2004 Zuniga et al.

* cited by examiner

DOWNLINK ORTHOGONAL VARIABLE SPREADING FACTOR CODE ASSIGNMENT METHOD AND BASE STATION SYSTEM USING THE SAME

This application claims the benefit of People's Republic of China application Serial No. 201110359582.9, filed Nov. 14, 2011, the subject matter of which is incorporated herein by reference.

BACKGROUND

1. Technical Field

The invention relates in general to a code division communication system and associated method, and more particularly to a downlink orthogonal variable spreading factor (OVSF) code assignment method and a base station system using the same.

2. Description of the Related Art

Figure 1:
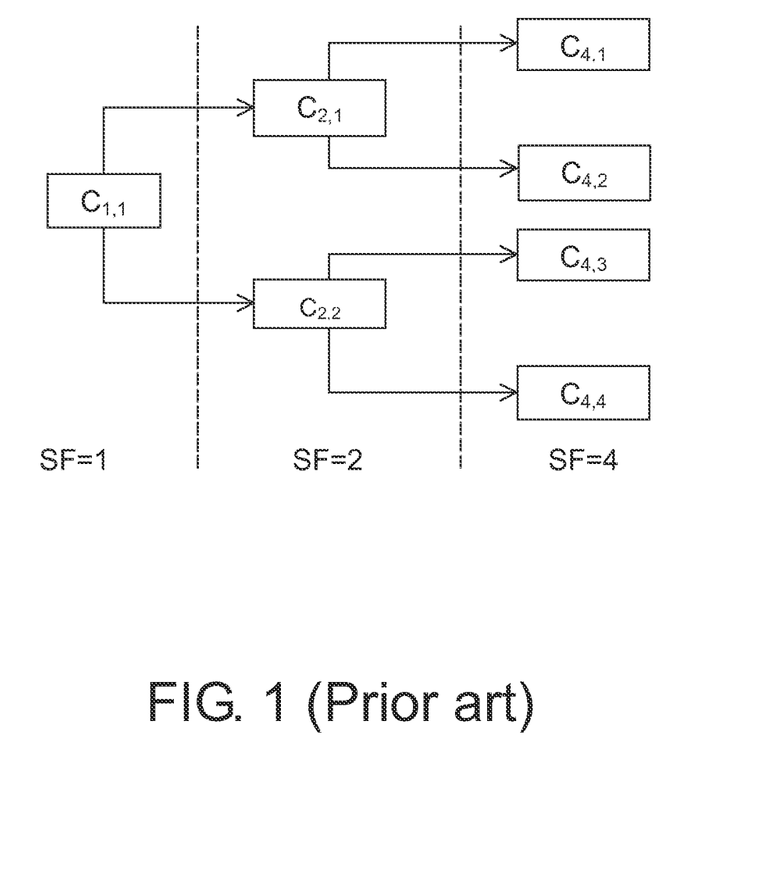
FIG. 1 (prior art) is a schematic diagram illustrating an OVSF code tree.

Orthogonal variable spreading factor (OVSF) codes are codes indicating a construction based on a binary tree. An OVSF code tree, hereinafter, code tree, is a full binary tree. Referring to FIG. 1, each node of the code tree can be uniquely determined according to a spreading factor and a layer sequence number. For example, $C_{2,1}$ represents the first node of SF2 layer, and so forth.

In a Wideband Code Division Multiple Access (WCDMA) system for Universal Mobile Telecommunications System (UMTS), a single OVSF code is assigned for a connection request, a connection of each mobile terminal is identified through orthogonality of the OVSF codes, wherein the OSVF codes serve as downlink channelization codes.

Due to the orthogonality constraint on OVSF code assignment, after an OVSF code is assigned, another OVSF code can be assigned only if the latter is of the same layer as that of the former or is not an ancestor or descendent node of the former, i.e., the former is orthogonal to the latter. In other words, a node and its ancestor node or descendent node are not orthogonal and cannot be simultaneously assigned. Such issue of unusable nodes resulted from the orthogonality constraint is referred to as code blocking.

An OVSF code assignment method affects whether code resource can be utilized sufficiently. Current code assignment methods are faced with certain difficulties of producing code fragments. For example, a leftmost code assignment method, which can be easily practiced but its algorithm has lower efficiency, renders a higher code blocking rate for high-speed service requests and produces a quite large number of fragments during service release. A leftmost fragment assignment method can also be easily practiced, and offers better efficiency of code fragment reduction than that of the leftmost code assignment. However, it still fails to solve the code fragment issue produced during service release. Further, a weighting method is more complicated to implement, and has a higher efficiency of code fragment reduction as well as a lower code blocking rate than the two previous methods. Yet, the weighting method is also incapable of solving the code fragment issue produced during service release.

Code management is targeted at management of a downlink OVSF code tree, which is utilized to assign orthogonal physical channels to different users. Since available codes are limited, there is a need for a method for effectively assigning channel codes to prevent code blocking.

SUMMARY OF THE INVENTION

The invention is directed to a downlink orthogonal variable spreading factor (OVSF) code assignment method and a base station system using the same.

According to an aspect of the present invention, a downlink OVSF code assignment method is provided. The method is applicable to a base station system or to a base station of a code division communication system. The method includes the following steps. In step (a), in response to a service request, it is determined whether a spreading factor required by the service request is greater than a remaining capacity of assignable spreading factors of a code tree. In step (b), when it is determined the spreading factor is smaller than the remaining capacity, searching is performed from a root of the code tree until a node of a layer corresponding to the required spreading factor is reached and thus defined as the first node. During the searching of the code tree, when a searched node of the code tree is in an unassigned state, the searching continues leftward in a lower layer of the code tree; and when the searched node is in an assigned state, the searching continues rightward in a same layer of the searched node. In step (c), it is determined, from the first node, whether any assignable code is available in the layer corresponding to the required spreading factor. In step (d), when the determination in step (c) is affirmative, an assignable code is assigned to a communication service corresponding to the service request.

According to another aspect of the present invention, a base station system is provided. The base station system includes a mobile communication unit and a processing unit. The mobile communication unit is for signal transceiving. The processing unit, coupled to the mobile communication unit, controls the mobile communication unit. In response to a service request, the processing unit determines whether a spreading factor required by the service request is greater than a remaining capacity of distributable OVFS codes of a code tree. When it is determined the spreading factor is smaller than the remaining capacity, the processing unit performs searching the code tree from a root of the code tree until a node of the code tree in a layer corresponding to the required spreading factor is reached and thus defined as a first node. During the searching of the code tree: when a searched node of the code tree is in an unassigned state, the searching continues leftward in a lower layer of the code tree with respect to the searched node; and when the searched node is in an assigned state, the searching continues rightward in a same layer of the searched node. The processing unit determines, from the first node, whether any assignable code is available in the layer corresponding to the required spreading factor. When an assignable code is available, the processing unit assigns the assignable code to control the mobile communication unit to perform a communication service corresponding to the service request.

In one embodiment, when no assignable code is available at the layer corresponding to the required spreading factor, a layer lower than the layer corresponding to the required spreading factor by k layers is searched, from a layer for k=1 to a last layer of the code tree, until $2^k$ assignable codes are found. The $2^k$ assignable codes are assigned to control the mobile communication unit to perform a communication service corresponding to the service request. The required spreading factor equals the spreading factor corresponding to the layer where the assignable codes are located divided by $2^k$.

The above and other aspects of the invention will become better understood with regard to the following detailed description of the preferred but non-limiting embodiments. The following description is made with reference to the accompanying drawings.

DETAILED DESCRIPTION

Embodiments of a downlink orthogonal variable spreading factor (OVSF) code assignment method, and a base station as well as a code division communication system using the same shall be described.

In the embodiment below, assigning a single OVSF code for a connection request in a WCMDA system for UMTS is taken as an example. As the OVSF code serves as a downlink channelization code, a radio network controller in charge of assigning downlink services is employed to perform code assignment when a base station replies to an access request coming from a terminal. In other embodiments, 3G protocols such as TD-SCMDA mobile communications standards or communication techniques adopting spread spectrum techniques can also be implemented based on their requirements of the embodiments.

Referring to FIG. 1, in this embodiment, nodes of a code tree may be categorized into three states including assigned, unassigned and forbidden. In code assignment, the states of the nodes of the code tree are detected (or searched) so as to determine whether a node can be assigned. When a particular node is assigned, the states of all of the node's descendent nodes and ancestor nodes to the root node are correspondingly changed to the forbidden state. When a particular node is released, the states of all of its descendent nodes are correspondingly changed to the unassigned state, and the states of all of its ancestor nodes to the root node are to be determined according to the states of other descendent nodes of the ancestor nodes of the released node.

Figure 2A:
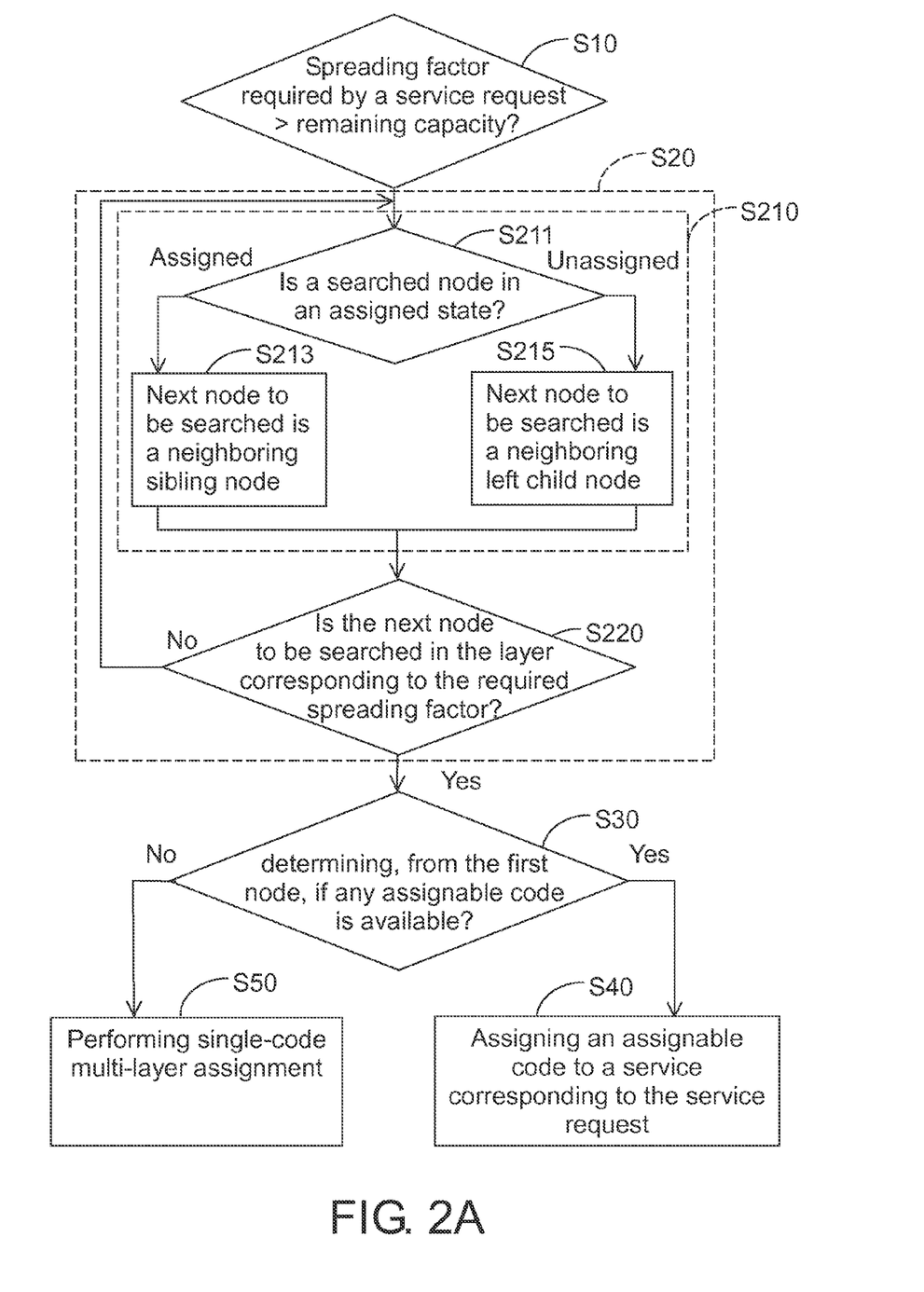
FIG. 2A is a flowchart of a downlink OVSF code assignment method according to one embodiment.

FIG. 2A shows a flowchart of a downlink OVSF code assignment method according to one embodiment. The code assignment method is applicable to a code division communication system, and includes the following steps.

In step S10, in response to a service request, it is determined whether a spreading factor required by the service request is greater than a remaining capacity of assignable spreading factors of a code tree.

In step S20, when it is determined that the spreading factor required by the service request is smaller than the remaining capacity, searching the code tree is performed from a root of the code tree until a node of a layer corresponding to the required spreading factor is reached. This node is defined as a first node, and is obtained by the searching, which may be illustrated by a path of searching the code tree. During the searching of the code tree, when a searched node of the code tree is in the unassigned state, the path (i.e., the searching) continues leftward in a lower layer of the code tree with respect to the searched node. When a searched node is in the assigned state, the path (i.e., the searching) continues rightward in a same layer of the code tree of the searched node. In such manner, the searching is proceeding until a searched node in the layer corresponding to the required spreading factor is reached.

Figure 3A:
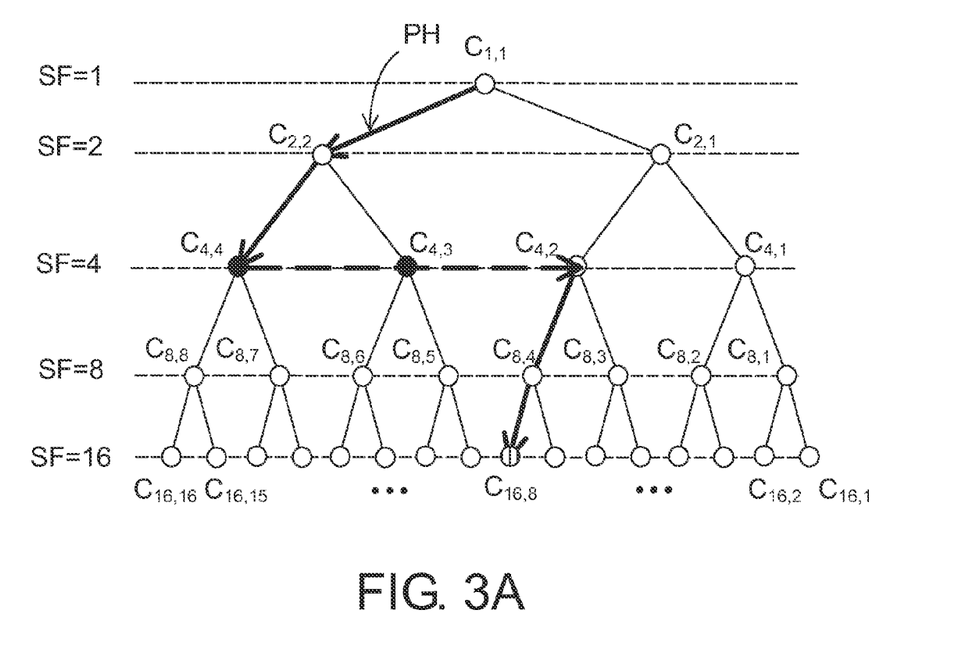
FIG. 3A is an example of step S20 of the downlink OVSF code assignment method in FIG. 2A according to one embodiment.

FIG. 3A illustrates an example of step S20 of the OVSF code assignment method in FIG. 2A according to one embodiment. In FIG. 3A, an empty circle represents an unassigned node, a solid circle represents an assigned node, and a thick solid line PH illustrates that the code tree is searched from the root and a first node is obtained by a path PH of searching the code tree. For example, it is assumed that a spreading factor required by a service request is SF=16. In response to the service request, searching is performed from the root of the code tree. The root corresponds to a spreading factor SF=1. A node $C_{1,1}$ in the layer corresponding to the spreading factor SF=1 is in the unassigned state, and so the path PH continues leftward in a lower layer of the code tree with respect to the node $C_{1,1}$. The lower layer corresponds to a spreading factor SF=2. In the layer corresponding to the spreading factor SF=2, a node $C_{2,2}$ is in the unassigned state, and so the path PH similarly continues leftward in a lower layer (corresponding to a spreading factor SF=4) of the code tree until a node $C_{4,4}$ is reached. The node $C_{4,4}$ is in the assigned state, and so the path PH continues rightward in the same layer, and a similar procedure is also performed on a node $C_{4,3}$. Since the code tree is not horizontally connected, the path PH in horizontal is represented by a thick dashed line. Next, a node $C_{4,2}$ is in the unassigned state, and so the path PH continues leftward in a lower layer (corresponding to a spreading factor SF=8). Thus, the path PH continues according to the above approach until reaching a node of a layer corresponding to the required spreading factor (SF=16). A node $C_{16,8}$ is regarded as a first node (represented by a circle shaded with vertical lines).

In step S30, it is determined, from the first node, whether any assignable code is available in the layer corresponding to the required spreading factor. When the determination in step S30 is affirmative, step S40 is performed to assign an assignable code to a communication service corresponding to the service request. In one embodiment, in step S30, whether an assignable code is available is determined from the first node to an assignable leftmost node of the layer (SF=16) corresponding to the required spreading factor. For example, in FIG. 3A, from the first node $C_{16,8}$ to the leftmost assignable node of the layer corresponding to the required spreading factor (SF=16), the first node $C_{16,8}$ is determined as the assignable code. For another example, assuming the first node $C_{16,8}$ has already assigned, a next leftmost assignable node is a node $C_{16,7}$, and so forth. In other embodiment, step S30 may be implemented by identifying the states of the nodes sequentially rightward in this layer (SF=16) and performing assignment if an unassigned node is found. In other embodiment, one of several assignable codes found in this layer can be selected and assigned.

In the above embodiment, the first node of the layer corresponding to the required spreading code can be quickly identified so as to further find a suitable assignable code, and such approach can be referred to as a first node location method. Based on the above embodiment, in another embodiment, a single-code multi-layer assignment may further be performed, e.g., as in step S50. When the determination in step S30 is negative, step S50 is performed. In step S50, a layer that is k layer lower than the layer corresponding to the required spreading factor is searched, from a layer for k=1 to a last layer of the code tree, until $2^k$ assignable codes in the searched layer are found. The $2^k$ assignable codes are assigned to a communication service corresponding to the service request. The required spreading factor equals a spreading factor corresponding to a searched layer where the $2^k$ assignable codes are found divided by $2^k$, numerically.

Figure 2B:
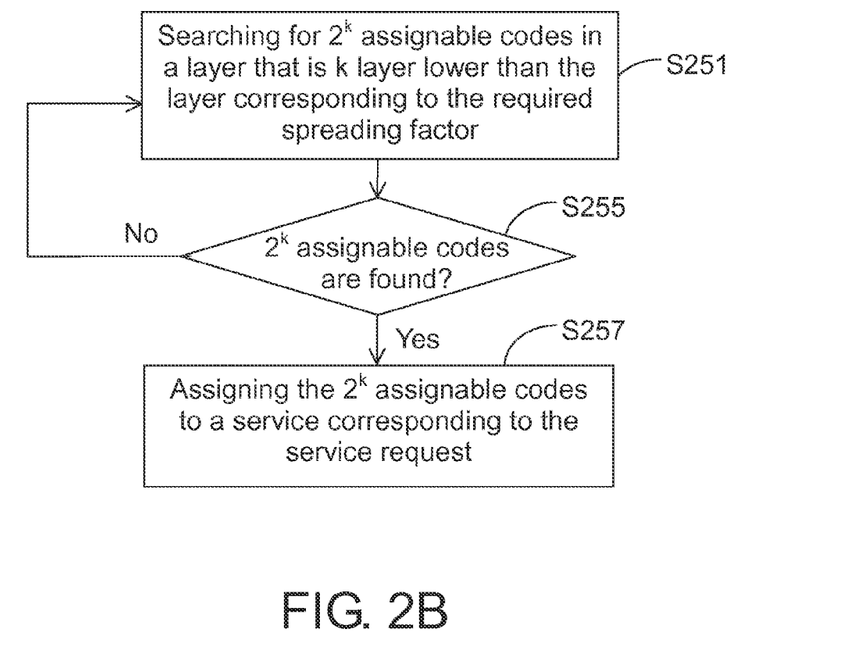
FIG. 2B is a flowchart of a downlink OVSF code assignment method according to one embodiment.

FIG. 2B shows sub-steps of step S50 in an example. In step S251, a next layer (i.e., a layer A+1, where k=1) of a layer A corresponding to the required spreading factor (or a previously adjusted spreading factor during searching) is searched for $2^k$ (i.e., 2) assignable codes. In step S255, it is determined whether $2^k$ assignable codes are found. When required nodes are not found in the layer A+1, step S251 is repeated to continue searching a next layer (i.e., a layer A+2, where k=2) for $2^k$ (i.e., 4) assignable codes, and so forth. In the layer A+k, the number of nodes for the required code resource is $2^k$, wherein the spreading factor corresponding to the layer A+k becomes $2^k$ times of the originally required spreading factor, numerically. In step S257, when the $2^k$ assignable codes are found, the assignable codes are assigned to a service corresponding to the service request.

Figure 3B:
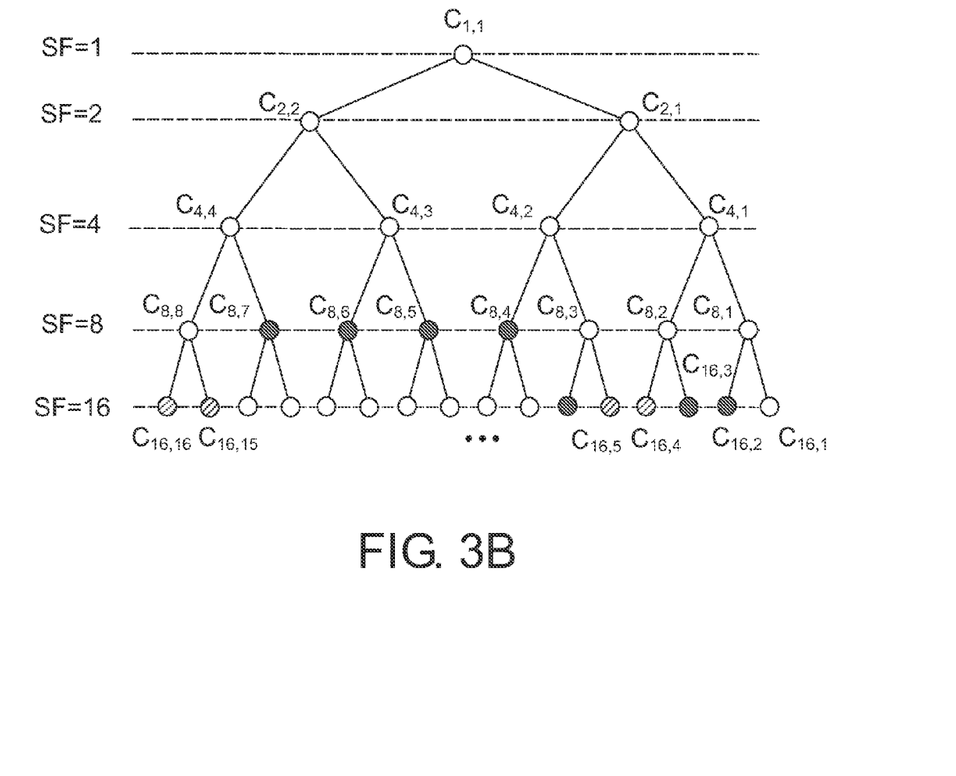
FIG. 3B is an example of step S50 of the downlink OVSF code assignment method in FIG. 2A according to one embodiment.

FIG. 3B illustrates an example of step S50. In FIG. 3B, a solid node represents an assigned node. Assume a service request requires a spreading factor SF=4. The layer corresponding to the spreading factor SF=4 is searched, and it is determined that no suitable assignable nodes are available in this layer according to assignment conditions of the code tree. Thus, the number of nodes for the code resource required by the request is adjusted to two nodes, and the spreading factor of each of the nodes is reduced to a half of the layer corresponding to the spreading factor SF=4. That is, assignment is expected to be performed in the layer having the spreading factor SF=8. Similarly, in the layer with SF=8, only a node $C_{8,8}$ is assignable, meaning that the assignment still cannot be fulfilled. The request condition is again adjusted, and four nodes $C_{16,5}, C_{16,4}, C_{16,16}$ and $C_{16,15}$ (circles shaded by slanted lines) in the layer with SF=16 are assigned finally. In this example, it is in equivalence that the originally required spreading factor (e.g., SF=4=16/$2^2$) equals the spreading factor (e.g., SF=16) corresponding to the layer where the assignable codes are found divided by $2^k$ (e.g., $2^2$), numerically.

In the above embodiment, step S20 is for determining a first node of the layer corresponding to a required spreading factor. In one embodiment, step S20 includes steps S210 and S220. Referring to FIG. 2A, step S210 is for determining a next node to be searched, and includes the following steps. In step S211, it is checked whether a searched node is in the assigned state so as to determine a next node to be searched. If the searched node is in the assigned state, step S213 is performed to determine a neighboring sibling node of the searched node as the next node to be searched. If the searched node in the unassigned state, step S215 is performed to determine a neighboring left child node of the searched node as the next node to be searched. In step S220, it is searched whether the next node to be searched is in the layer corresponding to the required spreading factor. If so, the next searched node is the first node. If not, the method proceeds from step S210 until a node of the layer corresponding to the required spreading factor is obtained as a next node to be searched. Step S30 is performed after the first node is obtained.

Figure 4:
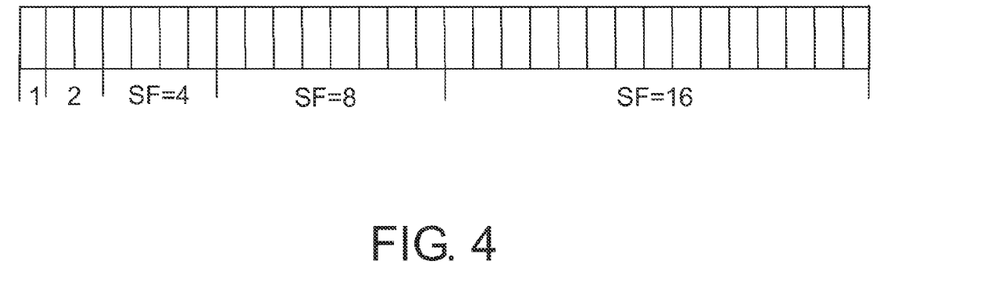
FIG. 4 is a schematic diagram illustrating a code tree realized by an array.

FIG. 4 shows a schematic diagram of a code tree implemented in the form of array, with nodes of the code tree sequentially correspond to a one-dimensional array. For example, nodes corresponding to spreading factors SF=1, 2, 4, 8 . . . , i.e., $\{C_{1,1}\}$, $\{C_{2,2}, C_{2,1}\}$, $\{C_{4,4}, C_{4,3}, C_{4,2}, C_{4,1}\}$, $\{C_{8,8}, C_{8,7}, C_{8,6}, C_{8,5}, C_{8,4}, C_{8,3}, C_{8,2}, C_{8,1}\}$, . . . , sequentially correspond to elements of the one-dimensional array, denoted by array[0 . . . n], in FIG. 4. When the above embodiment is implemented in a base station or a radio network controller by software, the code tree can be realized by data structure, e.g., a one-dimensional array, or used for storing data of the code tree, and a path of searching the code tree corresponds to the relationship (e.g., an increasing relationship) of a sequence of indices k (array[k]) of the one-dimensional array in a same direction. When the code tree is implemented by a buffer or a memory, a path for searching the code tree may correspond to the relationship of a sequence of addresses for accessing the memory. In other embodiments, the code tree may be realized by other data structure such as a binary tree structure, rather than being limited to the implementation with one-dimensional array.

The downlink OVSF code assignment method described in the foregoing embodiments can be applied to a base station, a radio network controller, or a spread spectrum communication system.

Figure 5:
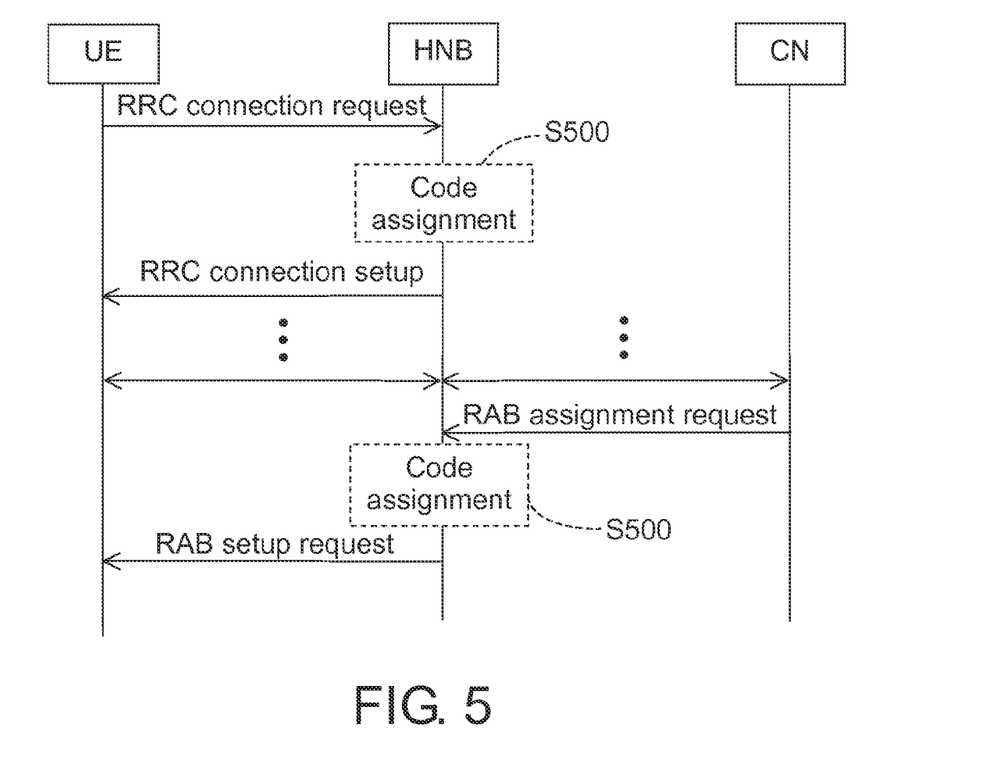
FIG. 5 is a sequence diagram illustrating an embodiment in which a femtocell employs the foregoing OVSF code assignment method to respond to a connection request from a user equipment.

A femtocell implementing the OVSF code assignment method is exemplified below. In a mobile communication system such as a 3G network, a femtocell connects to a user equipment (UE) in a household or a small area via an air interface, and connects the UE with a network of a network operator via a broadband network to achieve mobile data offloading. The femtocells may be categorized into home node-B (HNB) and home evolved node-B (HeNB). The femtocell(s) can be disposed in a household or an enterprise to provide wireless coverage and access services. FIG. 5 shows a sequence diagram illustrating an embodiment in which a femtocell employs the foregoing OVSF code assignment method to respond to a connection request from a UE. Referring to FIG. 5, for example, a UE sends a radio resource control (RRC) connection request to an NHB based on an RRC protocol of UMTS. In response to the request, the HNB implements signaling procedure for connection according to the RRC protocol, with code resource assignment. Blocks S500 in dashed border indicate that, regarding code resource assignment, the femtocell HNB, according to the procedure of the RRC protocol, implements the OVSF code assignment method of the above embodiment in view of the RRC connection request and system resource status of the HNB. Thus, the HNB assigns an appropriate OVSF code and establishes a downlink communication connection with the UE so as to provide the UE with downlink services. Further, when voice data are transmitted and multimedia services are executed between the UE and core network (CN), the CN sends a radio access bearer (RAB) assignment request to the HNB, such that the HNB is allowed to also implement the OVSF code assignment method of the foregoing embodiment to establish a downlink.

Figure 6:
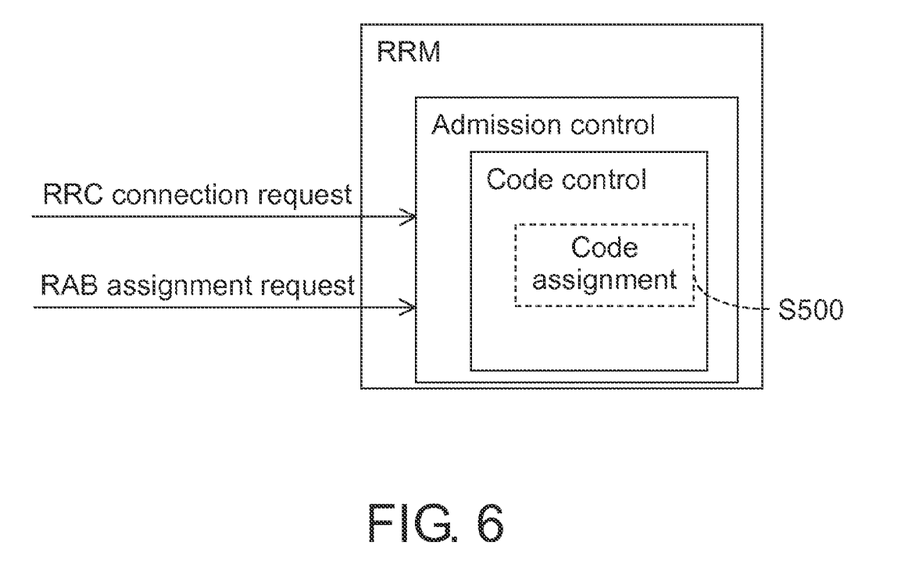
FIG. 6 is a schematic diagram of a radio resource management unit for implementing an OVFS code assignment method according to one embodiment.

FIG. 6 shows a radio resource management module for implementing the OVSF code assignment method according to one embodiment. The radio resource management (RRM) module includes an admission control unit, in response to an RRC connection request and an RAB assignment request, for performing code control, which may employ the OVSF code assignment method of the foregoing embodiment. In one embodiment, the RRM can be implemented in a radio network controller as an RRM module so as to achieve the above code assignment. In another embodiment, the RRM can also be implemented in a femtocell so as to perform the code assignment. The RRM module using the OVSF code assignment method of the foregoing embodiment can be implemented by hardware circuits, software, or firmware.

Figure 7:
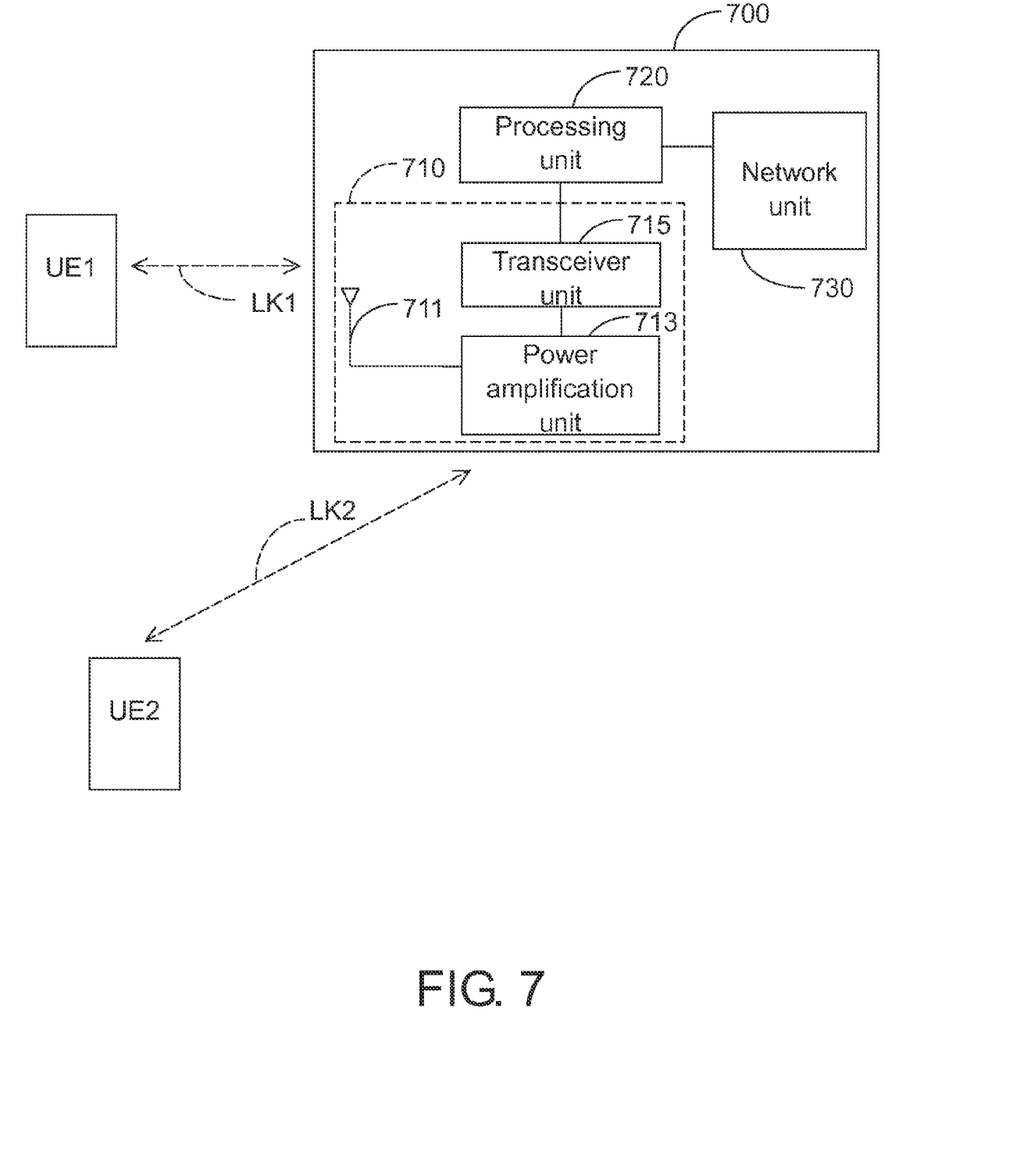
FIG. 7 is a schematic diagram of a femtocell system capable of code assignment according to one embodiment.

FIG. 7 shows a femtocell system capable of code assignment according to an embodiment. In one embodiment, a femtocell system 700 includes a mobile communication unit 710 and a processing unit 720. The femtocell 700 establishes wireless links with user equipments, e.g., wireless links LK1 and LK2 with user equipments UE1 and UE2, respectively. The wireless links LK1 and LK2 correspond to services assigned by the femtocell system 700 in view of the connection requests and system resource status of the femtocell system 700. The femtocell system 700 assigns an OVSF code for a connection request, and identifies a connection of each of the UEs according to orthogonality of their OVSF codes.

The mobile communication unit 710 may be regarded as an analog front end for radio signal transceiving. For example, the mobile communication unit 710 includes an antenna 711, a power amplification unit 713, and a transceiver unit 715. The antenna 711 is coupled to the power amplification unit 713, and the transceiver unit 715 is coupled to the power amplification unit 713. In other embodiments, the mobile communication unit 710 may be implemented by components or structure adapted for one or several adopted mobile communication modes (e.g., 2G, 3G and so on), thus not limited to the example above. For example, in order to perform appropriate handover for a UE leaving the 3G femtocell coverage, a 3G femtocell H(e)NB such as an HNB and an HeNB needs to monitor UMTS channels to detect nearby base stations and to detect 2G channels. Thus, in this example, the mobile communication unit 710 may include one or more analog front end circuit(s) corresponding to UMTS and 2G.

The processing unit 720, coupled to the mobile communication unit 710, is for controlling the mobile communication unit 710 to operate in at least one mobile communication mode (e.g., 2G, 3G and so on).

In one embodiment, in response to a service request, the processing unit 720 determines whether a spreading factor required by the service request is greater than a remaining capacity of assignable spreading factors of a code tree. When it is determined that the spreading factor is smaller than the remaining capacity, the processing unit 720 starts searching from a root of the node tree until a node of the code tree in a layer corresponding to the required spreading factor is reached and thus defined as a first node. The first node is obtained by the searching, which may be illustrated by a path of searching the code tree, as exemplified above. During the searching of the code tree, when a searched node is in an unassigned state, the path (i.e., the searching) continues leftward and downward (i.e., in a lower layer of the code tree); and when the searched node is in an assigned state, the path continues rightward in a same layer of the code tree of the searched node. The processing unit 720 determines, from the first node to a leftmost node of the layer corresponding to the required spreading factor, whether an assignable code is available. If the assignable code is available, the processing unit 720 assigns the assignable code so as to control the mobile communication unit 710 to perform a communication service corresponding to the service request.

In another embodiment, when the processing unit 720 determines that no assignable codes in the layer corresponding to the required spreading factor, the processing unit 720 further performs single-code multi-layer assignment. From a layer for k=1 to a last layer of the code tree, the processing unit 720 searches a layer that is k layer lower than the layer corresponding to the required spreading factor until $2^k$ assignable codes are found. The processing unit 720 assigns the $2^k$ assignable codes so as to control the mobile communication unit 710 to perform a communication service corresponding to the service request. The required spreading factor equals a spreading factor corresponding to a layer where the assignable codes are found divided by $2^k$.

Accordingly, the femtocell system 700 may implement the OVSF code assignment method according to the foregoing different embodiments, through software, hardware, or firmware. After assigning an OVSF code for a connection request, the femtocell system 700 controls the mobile communication unit 710 to establish a communication link according to the OVSF code or to perform spread spectrum coding of downlink data.

For example, the processing unit 720 may be implemented by a microcontroller, a field-programmable gate array (FPGA), an application specific integrated circuit (ASIC) or a system-on-chip (SoC).

Further, a physical entity of femtocell, regarded as a femtocell system, can be based on the processing unit 720 which implements a femtocell layer 1 (FL1) unit and a femtocell radio resource management (FRRM) unit. In another embodiment, the FRRM may be realized as an independent device and, for example, implemented by a processing unit in a femtocell gateway, while the FL1 may be implemented by a processing unit in the femtocell—the two may be collectively regarded as a femtocell system. For example, the FL1 unit represents a logic unit or a hardware unit for interconnection between a femtocell and a UE via a 3G mobile communication layer 1 Uu air interface. The FRRM unit represents a logic unit or a hardware unit for radio resource management between the FL1 unit and a core network (e.g., a network of a network operator). In one embodiment, the FL1 and FRRM units may be combined into a physical device of femtocell. In another embodiment, the FRRM unit may be an independent device.

In an alternative embodiment, in order to connect a UE to the network of a network operator via a broadband network, the femtocell system 700 includes a network unit 730 serving as an interface between the femtocell system 700 and the broadband network. In another embodiment, the network unit 730 serves as an interface between the femtocell system 700 and a femtocell gateway. Therefore, components or structure of the femtocell system 700 may be adapted for actual requirements, not limited to the embodiments above.

Further, in yet another embodiment, a 3G protocol such as WCDMA or TD-SCDMA mobile communication standard or 4G protocol such as LTE based standard can be implemented in a femtocell system according to any of the above embodiments.

It should be noted that, the OVSF code assignment method can be implemented in a base station, a gateway, or a radio network controller in addition to a femtocell, according to the above embodiments.

Therefore, a downlink OVSF code assignment method, a femtocell, and a code division communication system using the same are provided according to the above embodiments. In some embodiments, the foregoing first node location method or the method further including the single-node multi-layer assignment method leads to a simple, highly-effective and fair channelization code assignment method. An embodiment based on the first node location method and the single-code multi-layer assignment method may be referred to as an adaptive leftmost code assignment method, which not only is simpler than the weighting algorithm but is also more effective than the leftmost code assignment algorithm with respect to code resource utilization. The embodiment of the adaptive leftmost code assignment method allocates code resource to the same type of equipment as close as possible so as to mitigate code fragmentation of releasing code resource. Therefore, a communication system adopting the adaptive leftmost code assignment method may offer enhanced code assignment speed, reduces user wait time, utilizes OVSF code resource and mitigates code fragmentation effectively.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A downlink orthogonal variable spreading factor (OVFS) code assignment method, for use in a code division communication system, the method comprising:
   a) in response to a service request, determining whether a spreading factor required by the service request is greater than a remaining capacity of assignable spreading factors of a code tree;
   b) when it is determined that the required spreading factor is smaller than the remaining capacity, searching the code tree from a root of the code tree until a node of the code tree in a layer corresponding to the required spreading factor is reached and thus defined as the first node; during the searching of the code tree: when a searched node of the code tree is in an unassigned state, the searching continues leftward in a lower layer of the code tree with respect to the searched node; and when the searched node is in an assigned state, the searching continues rightward in a same layer of the searched node;
   c) determining, from the first node, whether any assignable code is available in the layer corresponding to the required spreading factor;
   d) when the determination in step (c) is positive, assigning an available assignable code to a communication service corresponding to the service request; and
   e) when the determination in step (c) is negative, searching a layer that is k layer lower than the layer corresponding to the required spreading factor, from a layer for k=1 to a last layer of the code tree, until $2^k$ assignable codes are found, and assigning the $2^k$ assignable codes to the communication service corresponding to the service request.

2. The method according to claim 1, wherein the required spreading factor equals a spreading factor corresponding to a searched layer where the assignable codes are found divided by $2^k$.

3. The method according to claim 1, whether the step (b) comprises:
   b1) checking whether a node of the code tree which is searched is in an assigned state so as to determine a next node to be searched, wherein if the searched node is in the assigned state, a neighboring sibling node of the searched node is determined as the next node to be searched; if the searched node in an unassigned state, a neighboring left child node of the searched node is determined as the next node to be searched; and
   b2) searching whether the next node to be searched is in the layer corresponding to the required spreading factor, wherein if so, the next searched node is the first node; if not, repeating from step (b1) until a node of the layer corresponding to the required spreading factor is searched.

4. The method according to claim 1, wherein in the step (c), it is determined whether any assignable code is available from the first node to an assignable leftmost node in the layer corresponding to the required spreading factor.

5. The method according to claim 1, wherein the nodes of the code tree sequentially correspond to a one-dimensional array, and a path for the searching of the code tree corresponds to an increasing sequence of indices of the one-dimensional array.

6. A base station system, comprising:
   a mobile communication unit, for signal receiving or transmission;
   a processing unit, coupled to the mobile communication unit, for controlling the mobile communication unit, and determining, in response to a service request, whether a spreading factor required by the service request is greater than a remaining capacity of assignable spreading factors of a code tree;
   wherein when it is determined that the spreading factor is smaller than the remaining capacity, the processing unit searches the code tree from a root of the code tree until a node of the code tree in a layer corresponding to the required spreading factor is reached and thus defined as a first node; during the searching of the code tree: when a searched node of the code tree is in an unassigned state, the searching continues leftward in a lower layer of the code tree with respect to the searched node; and when the searched node is in an assigned state, the searching continues rightward in a same layer of the searched node;
   wherein the processing unit determines, from the first node, whether any assignable code is available in the layer corresponding to the required spreading factor; and when an assignable code is available, the processing unit assigns the assignable code to control the mobile communication unit to provide a communication service corresponding to the service request; and
   wherein when the processing unit determines that no assignable code is available in the layer corresponding to the required spreading factor, the processing unit searches a layer that is k layer lower than the layer corresponding to the required spreading factor, from a layer for k=1 to a last layer of the code tree, until $2^k$ assignable codes are found, and assigns the $2^k$ assignable codes so as to control the mobile communication unit to perform the communication service corresponding to the service request.

7. The base station system according to claim 6, wherein the required spreading factor equals a spreading factor corresponding to a searched layer where the assignable codes are found divided by $2^k$.

8. The base station system according to claim 6, wherein the processing unit, determines whether any assignable code is available from the first node to a leftmost node in the layer corresponding to the required spreading factor.

9. The base station system according to claim 6, further comprising a network unit for providing an interface between the base station system and a broadband network.

10. The base station system according to claim 9, wherein the base station system is a femtocell base station.

11. The base station system according to claim 10, wherein the mobile communication unit comprises at least one analog front end circuit corresponding to at least one mobile communication mode.

12. The base station system according to claim 11, wherein the at least one mobile communication mode includes at least one of second generation and third generation mobile communication modes.

13. The base station system according to claim 12, wherein the third generation mobile communication mode is compliant to WCDMA or TD-SCDMA.

\* \* \* \* \*